United States Patent
Mondal

(10) Patent No.: US 12,490,344 B2
(45) Date of Patent: Dec. 2, 2025

(54) METHOD FOR REDUCING MAGNETIC FIELD EMISSION FOR HEATED SEATS AND OTHER APPLICATIONS

(71) Applicant: HELLA GMBH & CO. KGAA, Lippstadt (DE)

(72) Inventor: Debabrato Kumar Mondal, Novi, MI (US)

(73) Assignee: HELLA GMBH & CO. KGAA, Lippstadt (DE)

( * ) Notice: Subject to any disclaimer, the term of this patent is extended or adjusted under 35 U.S.C. 154(b) by 982 days.

(21) Appl. No.: 17/630,603

(22) PCT Filed: Jul. 31, 2020

(86) PCT No.: PCT/IB2020/057272
§ 371 (c)(1),
(2) Date: Jan. 27, 2022

(87) PCT Pub. No.: WO2021/024134
PCT Pub. Date: Feb. 11, 2021

(65) Prior Publication Data
US 2022/0256651 A1    Aug. 11, 2022

Related U.S. Application Data

(60) Provisional application No. 62/882,001, filed on Aug. 2, 2019.

(51) Int. Cl.
*H05B 1/02* (2006.01)
*B60N 2/56* (2006.01)
(Continued)

(52) U.S. Cl.
CPC ......... *H05B 1/0219* (2013.01); *B60N 2/5685* (2013.01); *H02H 9/025* (2013.01);
(Continued)

(58) Field of Classification Search
None
See application file for complete search history.

(56) References Cited

U.S. PATENT DOCUMENTS 5,550,702 A * 8/1996 Schmidt ................. H02H 9/025
361/103
6,841,979 B2 * 1/2005 Berson ................ H02M 1/4258
323/285
(Continued)

FOREIGN PATENT DOCUMENTS

CN    203416236 U    1/2014
CN    107482610 A    12/2017
(Continued)

OTHER PUBLICATIONS

International Search Report for PCT/IB2020/057272 dated Sep. 25, 2020, 4 pages.
(Continued)

Primary Examiner — Thor S Campbell
(74) Attorney, Agent, or Firm — WARNER NORCROSS + JUDD LLP

(57) ABSTRACT

A system and a method for controlling a power MOSFET for limiting electromagnetic interference from a load is provided. The system and method include a pulse-width-modulated (PWM) control voltage to operate the power MOSFET in accordance with its Ohmic region (linear mode). By operating the power MOSFET in its Ohmic region, the electromagnetic field generated by the load is reduced, without requiring a dedicated DC/DC converter that would otherwise increase the cost, size, and weight of the power electronics.

13 Claims, 5 Drawing Sheets

(51) Int. Cl.
*H02H 9/02* (2006.01)
*H03K 17/16* (2006.01)
*H05B 3/00* (2006.01)

(52) U.S. Cl.
CPC ......... *H03K 17/165* (2013.01); *H05B 1/0238* (2013.01); *H05B 3/0019* (2013.01); *H05B 2203/029* (2013.01)

(56) References Cited

U.S. PATENT DOCUMENTS

| | | | |
|---|---|---|---|
| 8,559,152 B2* | 10/2013 | Cao | H02M 3/33507 361/103 |
| 9,553,501 B2* | 1/2017 | Yao | H02M 1/32 |
| 9,577,536 B2* | 2/2017 | Yang | H02H 7/125 |
| 2014/0043076 A1 | 2/2014 | Hesener | |
| 2020/0382110 A1 | 12/2020 | Meline et al. | |
| 2022/0256651 A1* | 8/2022 | Mondal | H05B 3/0019 |
| 2023/0253783 A1* | 8/2023 | Mondal | H01M 50/204 320/134 |

FOREIGN PATENT DOCUMENTS

| | | |
|---|---|---|
| CN | 109600128 A | 4/2019 |
| EP | 1489730 A2 | 12/2004 |
| KR | 101642761 B1 | 8/2016 |
| WO | 2019121216 A1 | 6/2019 |

OTHER PUBLICATIONS

Machine assisted English translation of KR101642761B1 obtained from https://worldwide.espacenet.com/patent on Jan. 27, 2022, 11 pages.

* cited by examiner ature-controlled vehicle seats. The present invention can also reduce the inrush current or starting current for capacitive and inductive loads, providing cost savings for switching operations.

METHOD FOR REDUCING MAGNETIC FIELD EMISSION FOR HEATED SEATS AND OTHER APPLICATIONS

CROSS-REFERENCE TO RELATED APPLICATIONS

This application claims the benefit of U.S. Provisional Application 62/882,001, filed Aug. 2, 2019, the disclosure of which is incorporated by reference in its entirety.

FIELD OF THE INVENTION

The present invention relates to the operation of power MOSFETs in switching applications to reduce emissions and interference from electromagnetic fields, optionally for use in temperature-controlled vehicle seats. The present invention can also reduce the inrush current or starting current for capacitive and inductive loads, providing cost savings for switching operations.

BACKGROUND OF THE INVENTION

Electric seat heaters for motor vehicles include a heat mat for converting electrical energy into heat. The heat mat includes a resistive heating element that is positioned close to the trim cover, often in a serpentine pattern. Modern heat mats are characterized by a short warm-up phase and an even distribution of heat for providing comfort in cold weather conditions and over long distance driving.

Heat mats are typically controlled by a power MOSFET. The power MOSFET provides a pulse-width-modulated drain source current ($I_{DS}$) for regulating the thermal output of the seat mat. However, when heat mats are energized, the electromagnetic emissions or interference can be undesirably high, sometimes exceeding International Commission on Non-Ionizing Radiation Protection (ICNIRP) guidelines for time-varying electromagnetic fields. Since the resistance of the heat mat varies with temperature, the electromagnetic emissions can be especially problematic at lower temperatures, when the het mat resistance is lowered.

Accordingly, there remains a continued need for a system and a method for regulating power to a heat mat, or other resistive load, to minimize the resulting electromagnetic field, particularly during turn-on and turn-off of the resistive load.

SUMMARY OF THE INVENTION

A system and a method for controlling a power MOSFET for limiting electromagnetic emissions and interference from a load is provided. The system and method include a pulse-width-modulated (PWM) control voltage to operate the power MOSFET in accordance with its Ohmic region (linear mode). By operating the power MOSFET in its Ohmic region, the electromagnetic field generated by the load is reduced, without requiring a dedicated DC/DC converter that would otherwise increase the cost, size, and weight of the electronic control module.

In one embodiment, a control circuit includes a power MOSFET and a resistive load, for example a heat mat. The power MOSFET includes a gate terminal connected to a PWM gate voltage ($V_{GS}$) for controlling current through the power MOSFET, which is series connected to the heat mat. The frequency and the duty cycle of the PWM gate voltage ($V_{GS}$) are iteratively selected such that the power MOSFET operates only in its Ohmic region, as optionally measured by the rate of change of current (di/dt) through a shunt resistor, for example. Further the present invention can control the rate of change of current (di/dt) and rate or change of voltage (dv/dt) for any load, including resistive, capacitive, and inductive loads.

The present method is uniquely adapted to dynamically determine the Ohmic operating range of the power MOSFET for a given resistive load, without prior knowledge of the resistive load. For example, a universal power supply module can provide electromagnetic interference mitigation for a wide range of heat mats by internally calibrating its power MOSFET control voltage without special knowledge of the heat mats. Additional embodiments include winding the heater coil in a first direction and in a second, opposite direction, such that the magnetic field is canceled along the length of the heater coil.

These and other features and advantages of the present invention will become apparent from the following description of the invention, when viewed in accordance with the accompanying drawings and the appended claim.

DETAILED DESCRIPTION OF THE PRESENT EMBODIMENT

I. Ohmic Operation of Power MOSFET

In the present embodiment, a power MOSFET is used as a switch to control the flow of power to an electrical load, and in particular, a resistive heating element for an electric seat heater. As is known in the art, a MOSFET is a three-terminal device in which the gate voltage controls the flow of current between a source and a drain. The system and method of the present invention limit electromagnetic emissions and interference from the electric seat heater by operating the power MOSFET in its Ohmic region. Before the system and the method are discussed in greater detail, general operation of a power MOSFET in its Ohmic region will now be described.

Figure 1:
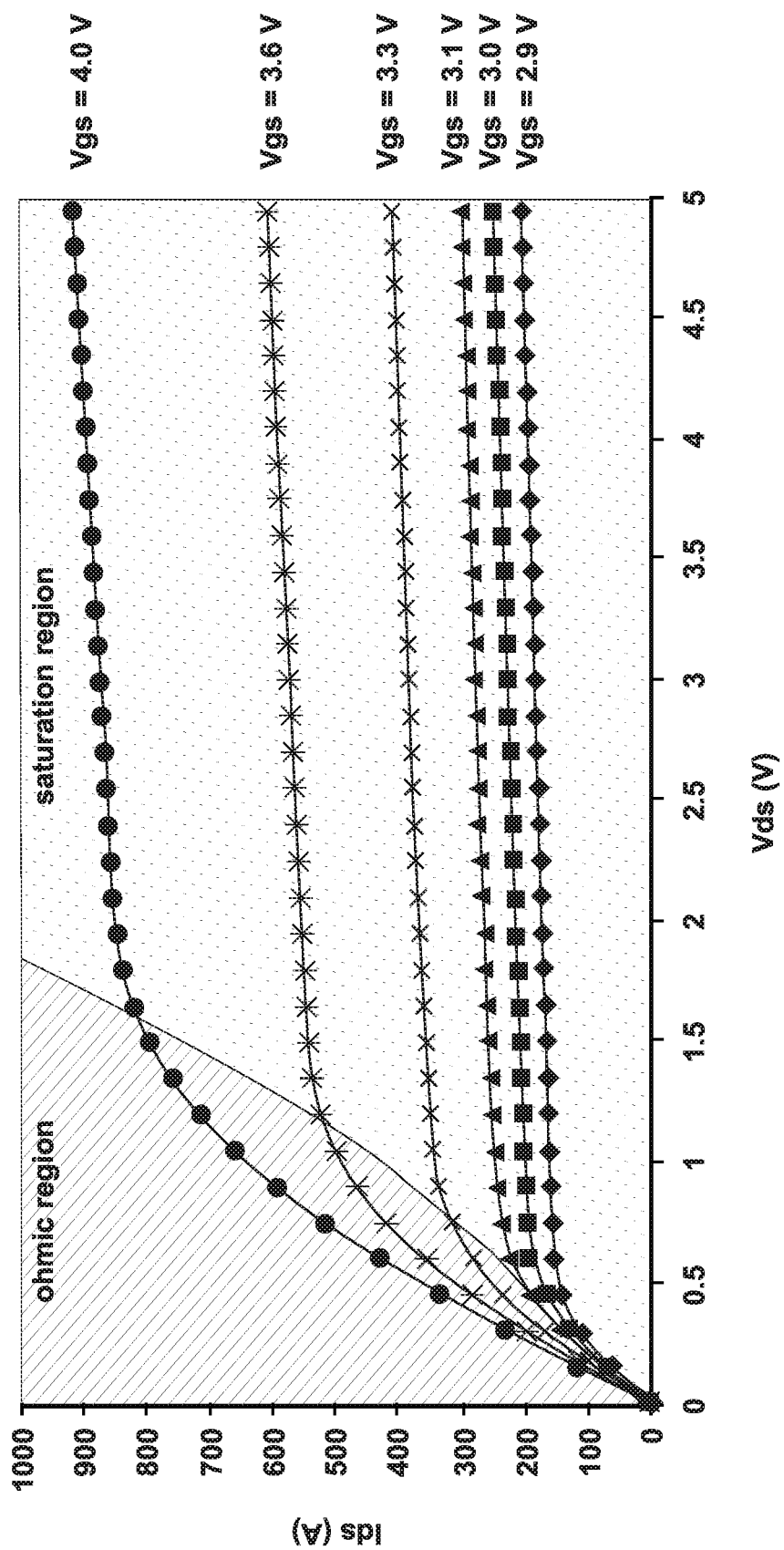
FIG. 1 is an operating area diagram depicting the output characteristics of a power MOSFET, including an Ohmic (linear) region and a saturation region.

Referring to FIG. 1, the output characteristics of an exemplary power MOSFET are shown, with the drain-source current ($I_{DS}$) depicted on the y-axis and the drain-source voltage ($V_{DS}$) depicted on the x-axis. In the Ohmic region (at left), the relationship between drain-source current ($I_{DS}$) and drain source voltage ($V_{DS}$) follows Ohm's law, in that the drain-source current ($I_{DS}$) is linearly proportional to the drain-source voltage ($V_{DS}$). For this reason, the Ohmic region of the power MOSFET is often referred to as "linear mode."

In the saturation region (at right), the drain-source current ($I_{DS}$) is nearly independent of the drain-source voltage ($V_{DS}$)

and instead depends heavily on the gate voltage ($V_{GS}$). Stated differently, the load current ($I_{DS}$) first increases as the load path voltage ($V_{DS}$) increases in the Ohmic region, and then increases only slightly or less than proportionally as the load path voltage ($V_{DS}$) increases in the saturation region. The point at which saturation begins is higher for higher control voltages ($V_{GS}$), for example 100 A for a 2.9V control voltage and 800 A for a 4V control voltage. In order to reduce electromagnetic interference (EMI) in the load, it is desirable to operate the MOSFET only in its linear mode (Ohmic region) or at the transition between the Ohmic region and the saturation region. As set forth in Part II below, this is achieved by controlling the gate voltage ($V_{GS}$) duty cycle and frequency. The gate voltage ($V_{GS}$) is, for example, a pulse-width-modulated (PWM) signal, such that the frequency and duration of the individual control pulses and the time interval between two successive pulses can vary.

II. System and Method for Mitigating EMI

Figure 2:
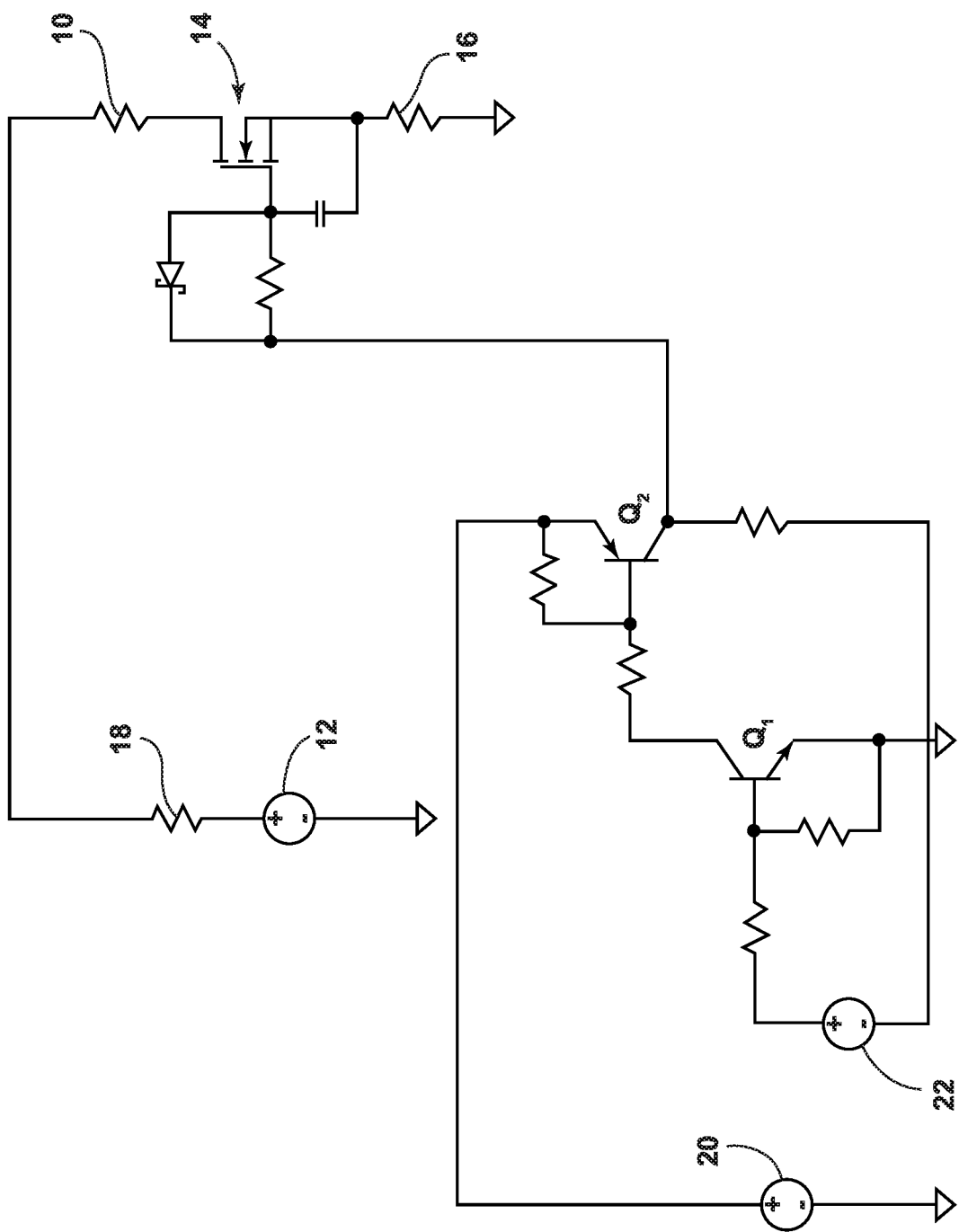
FIG. 2 is a circuit diagram including a frequency (f) and duty cycle (D) controlled power MOSFET for mitigating electromagnetic interference from a resistive load.

Referring now to FIG. 2, a control circuit for mitigating EMI by operating a power MOSFET substantially in its Ohmic region is illustrated. The control circuit includes a resistive load 10, and in particular, a resistive heating element, that is series connected between a 16V power supply 12 and the drain terminal of a power MOSFET 14. The MOSFET source terminal is connected to a shunt resistor 16 for measuring the drain source current ($I_{DS}$), which is also the current through the resistive load 10. A further shunt resistor 18 is illustrated as being series connected between the power supply 12 and the resistive load 10 for measuring the power output of the power supply 12.

As also shown in FIG. 2, the gate voltage ($V_{GS}$) of the power MOSFET 14 is controlled by actuation of first and second switch elements Q1, Q2, which are depicted as BJT transistors, but can include other switching elements in other embodiments. In particular, first and second switch elements Q1, Q2 cause the power MOSFET 14 to receive a gate voltage ($V_{GS}$) having a desired duty cycle and a desired frequency. DC power supply 20 is selectively coupled to the gate terminal of the MOSFET 14 when switching element Q2 is closed, which is in turn responsive to actuation of switching element Q1. Switching element Q1 is voltage controlled based on the output of power supply 22, which is optionally microcontroller-controlled. Because the power MOSFET 14 includes short switching times through its Ohmic region, millisecond duty cycle control of the gate voltage ($V_{GS}$) is possible in the linear mode, regardless of the load.

Figure 3:
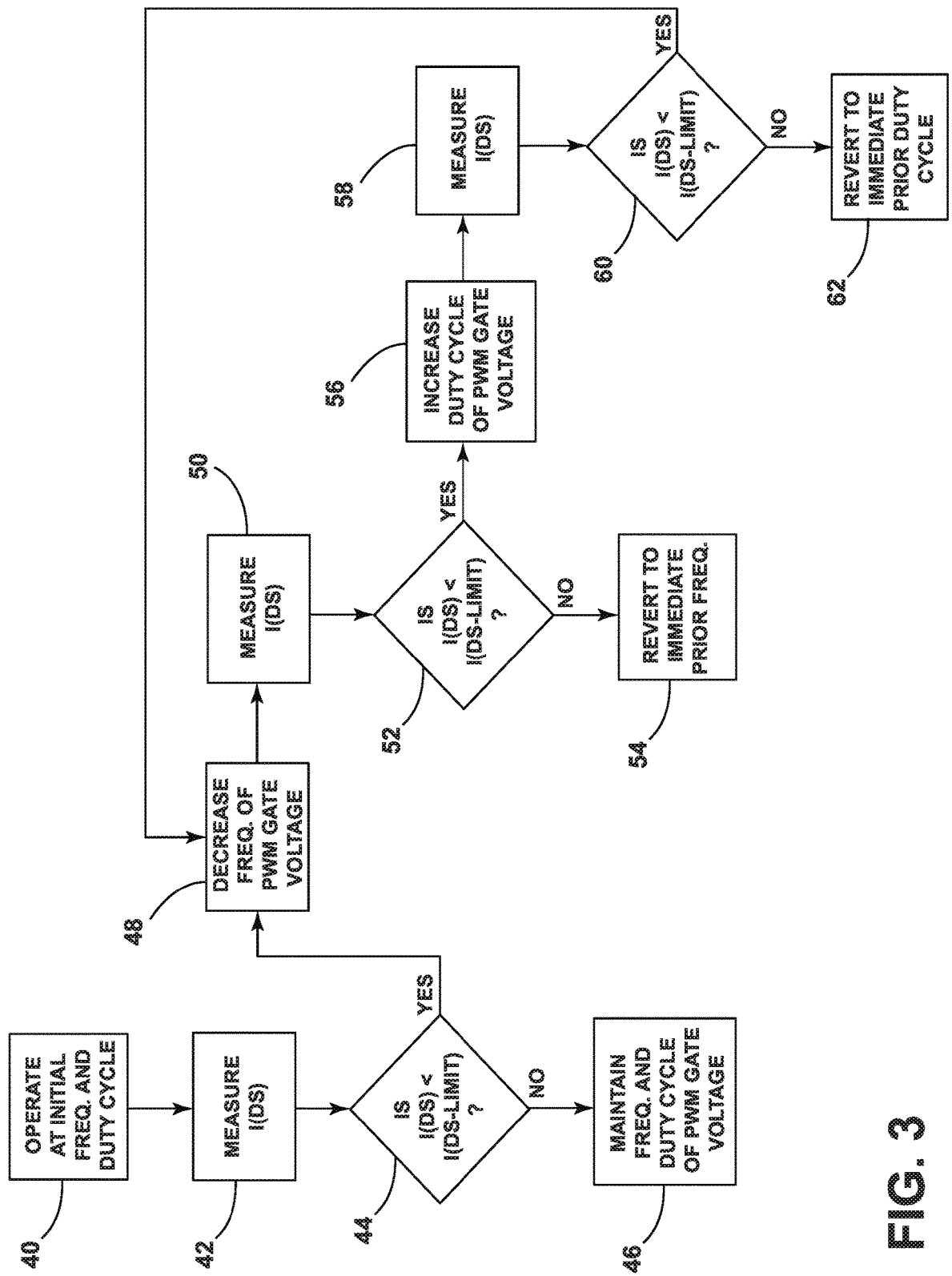
FIG. 3 is a flow chart illustrating frequency (f) and duty cycle (D) control of a power MOSFET for mitigating electromagnetic interference from a resistive load.

Operation of the control circuit of FIG. 2 is illustrated in connection with the functional block diagram of FIG. 3. As noted above, the gate voltage ($V_{GS}$) duty cycle (D), which is the ratio of the MOSFET on duration to the switching time period, is varied, as is the gate voltage frequency (f). At step 40, the method includes activating the power MOSFET 14 with a pulse-width-modulated (PWM) gate voltage ($V_{GS}$) at a baseline frequency (e.g., 100 kHz) and duty cycle (e.g., 0.02). At step 42, the method includes measuring the current ($I_{DS}$) in the load path. In the present embodiment, this measurement is performed by measuring the voltage across the shunt resistor 16, which as noted above is series-connected to the resistive load 10. At decision step 44, the measured current ($I_{DS}$) is compared with a current limit value ($I_{DS\text{-}Limit}$). If the measured current ($I_{DS}$) is not less than the current limit value ($I_{DS\text{-}Limit}$), the method includes maintaining the frequency (f) and the duty cycle (D) of the pulse-width-modulated gate voltage ($V_{GS}$) at step 46. If the measured current ($I_{DS}$) is less than the current limit value ($I_{DS\text{-}Limit}$), the method includes iteratively decreasing (decrementing) the frequency (f) and iteratively increasing (incrementing) the duty cycle (D). For example, the frequency (f) can be reduced in 2 kHz decrements to 98 kHz at step 48, and the load current ($I_{DS}$) measured at step 50. If the current limit value ($I_{DS\text{-}Limit}$) is met at decision step 52, the method includes returning to the immediately preceding frequency at step 54. If the current limit value ($I_{DS\text{-}Limit}$) is not met at decision step 52, the duty cycle is increased at step 56, optionally in increments of 0.02 to a duty cycle (D) of 0.04. The load current ($I_{DS}$) is again measured at step 58 and compared with the current limit value ($I_{DS\text{-}Limit}$) at decision step 60. If the current limit value ($I_{DS\text{-}Limit}$) is not met, the frequency (f) and duty cycle (D) is again iteratively increased at step 48, and the load current ($I_{DS}$) is measured at step 50. If however the load current ($I_{DS}$) is equal to or greater than the current limit value ($I_{DS\text{-}Limit}$), the method includes returning to the immediately preceding duty cycle at step 62. In other embodiments, the gate voltage is a digital output provided by a controller, for example a proportional-integral-derivative controller.

Figure 4:
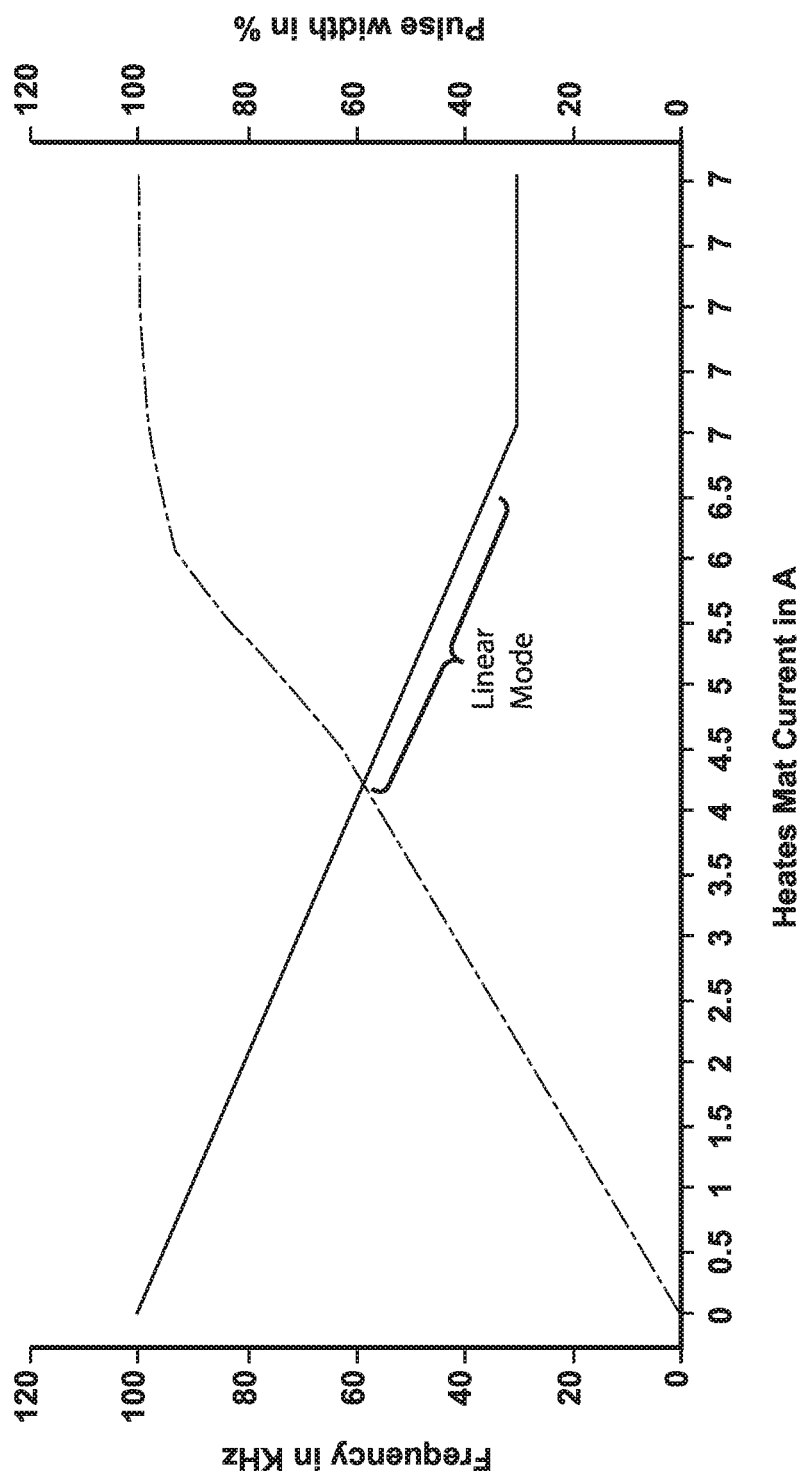
FIG. 4 is a graph illustrating the gate voltage ($V_{GS}$) frequency (f) and duty cycle (D) as a function of the heat mat current ($I_{DS}$).
Figure 5:
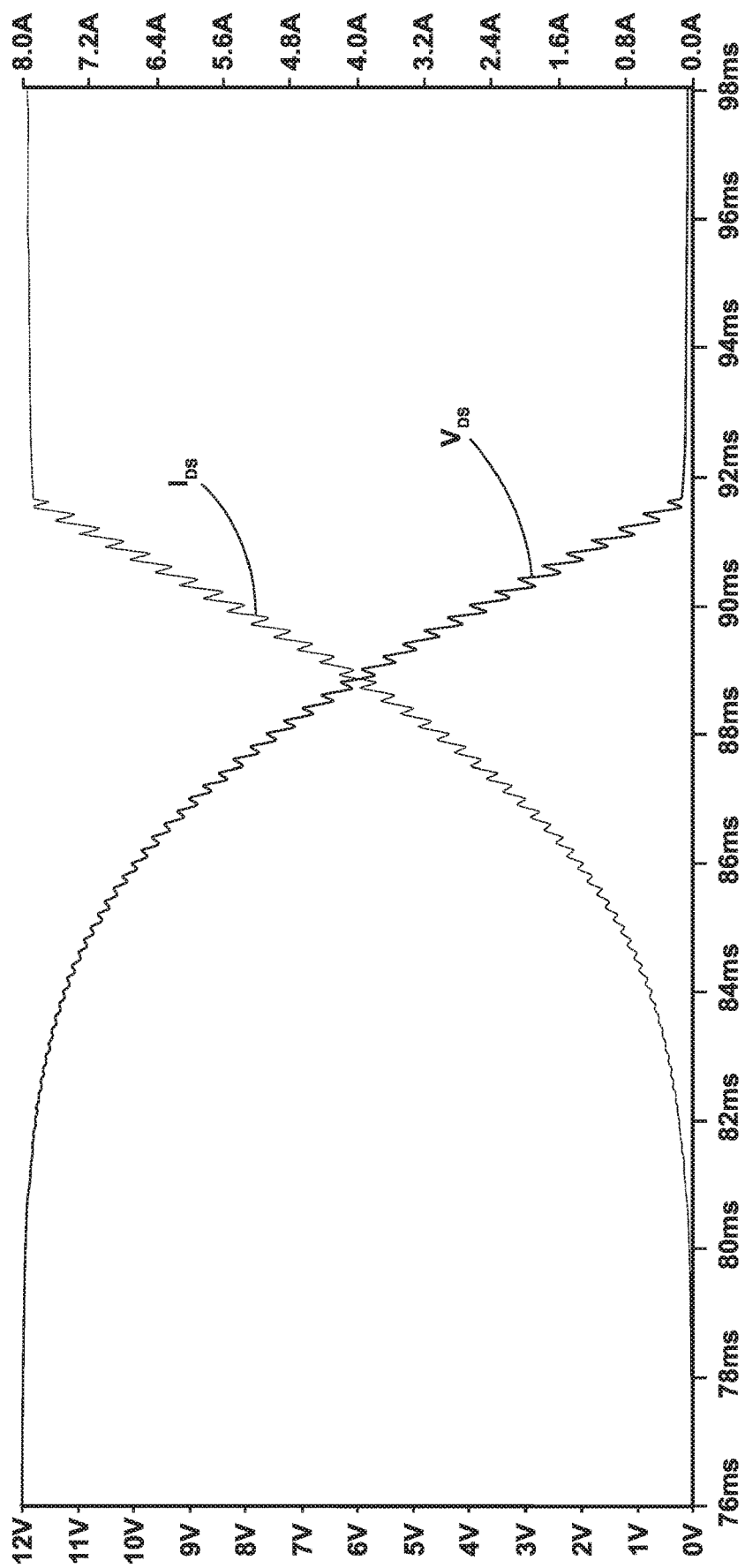
FIG. 5 is a graph that illustrating the drain-source voltage ($V_{DS}$) and drain-source current ($I_{DS}$) as a function of time.

To further illustrate frequency and duty cycle control of the power MOSFET, the frequency (f) and duty cycle (D) of the gate voltage ($V_{GS}$) are plotted as a function of the heat mat current ($I_{DS}$) in FIG. 4. As shown in FIG. 4, the pulse-width-modulated gate voltage ($V_{GS}$) includes a frequency (solid line) that decreases from 100 kHz to approximately 30 kHz, with a corresponding increase in heat mat current. Interleaved with this decrease in frequency, the pulse-width-modulated gate voltage ($V_{GS}$) includes a duty cycle (broken line) that increases from zero to approximately unity, with a corresponding increase in heat mat current. The linear operating mode of the power MOSFET is shown in FIG. 4 as being between 4 A and 6.5 A. The current limit value ($I_{DS\text{-}Limit}$) is selected to be approximately 6A in this example, ensuring that the power MOSFET operates in its Ohmic region with a gate voltage frequency of between 30 kHz and 50 kHz and a duty cycle (pulse width %) of between 0.3 and 0.6. The drain-source voltage ($V_{DS}$) and drain-source current ($I_{DS}$) for the circuit of FIG. 2 are plotted as a function of time in FIG. 5. In this simulation, drain-source current ($I_{DS}$) gradually increases from zero (as the gate voltage duty cycle increases from zero) to a maximum of 8A, while the drain source voltage ($V_{DS}$) decreases over the same time interval.

Laboratory testing revealed the ability of the system and method of the present invention to reduce electromagnetic interference. In particular, electromagnetic emissions were evaluated during turn on and turn off a 7 A heat mat. During turn on, the detected emissions were found to be only 77% of ICNIRP guidelines for time-varying electromagnetic fields. During turn off, the detected emissions were found to be only 65% of ICNIRP guidelines for time-varying electromagnetic fields. The present system and method was also determined to reduce the start-up current for the heat mat at lower temperatures, resulting in more flexibility for the heat mat.

In the foregoing mode of operation, the load current rate of change (di/dt) is monitored by the controller as the load current load current ($I_{DS}$) gradually increased to the current limit value ($I_{DS\text{-}Limit}$). The load current rate of change (di/dt) is maintained below a predetermined threshold that is stored to computer readable memory, and by extension, the rate of change of the load path voltage ($V_{DS}$) is also kept below a predetermined threshold. As an alternative mode of operation, the load current rate of change (di/dt) is monitored through the shunt resistor 16. As the rate of change in current (di/dt) slows, i.e., as di/dt falls below a threshold while the gate voltage ($V_{GS}$) increases, a controller (not shown) interprets this condition as the transition point between the linear mode and the saturation mode. In this case, the controller varies the PWM gate voltage ($V_{GS}$) and iteratively identifies a range of PWM control voltages for the given load, at which the rate of change in current (di/dt) stays positive (above the threshold) throughout activation of the power MOSFET. In various embodiments, the gate voltage is between 0 and 2.9V, with a duty cycle between 0.2 and 0.8 and a frequency between 20 and 80 kHz. As shown in FIG. 4, for example, a frequency of between about 40 and 60 kHz provided up to 7 A of current to the heat mat, with operation of the MOSFET only in the linear mode.

As noted above, the electromagnetic field of the series-connected heat mat was found to be significantly lower by operating the power MOSFET in its linear mode. Because the present method operates iteratively, it is uniquely adapted to dynamically determine the MOSFET's linear mode for a given resistive load, without prior knowledge of the load itself. As a consequence, the present invention can be implemented in combination with a wide variety of heat mats. For example, a universal power supply module can provide EMI-mitigation to a wide range of heat mats by internally calibrating its power MOSFET during regular operation.

As an alternative solution, the resistive element can extend in a serpentine pattern in a first direction, and can extend in the same serpentine pattern in a second direction, opposite of the first direction, such that the magnetic field generated by the resistive element is self-canceling. Stated differently, the resistive element can double-back within the heat mat, such that at any given point along the serpentine winding, two sections of the resistive element are situated side-by-side. As a result, the magnetic field generated by the DC current in a first direction is canceled by the magnetic field generated by the DC current in a second, opposite direction. In this respect, the EMI generated by the heat mat is reduced at the load, rather than by operation of the power MOSFET in linear mode. In still further embodiments, the heat mat manufactured according to this construction can be used with a power MOSFET in linear mode to further reduce EMI from the heat mat.

The above description is that of a current embodiment of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. A method for pulse-width-modulated (PWM) control of a power MOSFET having a load path, the method comprising:
   (a) providing an electrical load that is series connected with the load path of the power MOSFET;
   (b) activating the power MOSFET with a PWM gate voltage, the PWM gate voltage having a frequency and a duty cycle;
   (c) measuring the current in the load path of the power MOSFET during activation of the power MOSFET;
   (d) comparing the measured current in the load path of the power MOSFET with a current limit value;
   (e) iteratively decreasing a frequency of the PWM gate voltage and increasing a duty cycle of the PWM gate voltage until the measured current in the load path is determined to exceed the current limit value; and
   (f) if the measured current in the load path is not less than the current limit value, reverting to an immediately previous frequency or duty cycle of the PWM gate voltage.

2. The method of claim 1 wherein the electrical load is a resistive element of an electric seat heater.

3. The method of claim 1 wherein the electrical load is coupled to a drain terminal or a source terminal of the power MOSFET.

4. The method of claim 1 further including a capacitor coupled in parallel between a gate terminal and a source terminal of the power MOSFET.

5. The method of claim 1 wherein steps (b) through (f) are performed by a proportional-integral-derivative controller or with reference to a look-up table stored to memory.

6. A system for pulse-width-modulated (PWM) control of a power MOSFET, the system comprising:
   a power MOSFET having a load path;
   an electrical load that is series connected with the load path of the power MOSFET;
   a current sensor adapted to measure a current value in the load path of the power MOSFET;
   a voltage source adapted to provide a variable PWM gate voltage to the power MOSFET,
wherein the voltage source is operable to iteratively decrease a frequency of the PWM gate voltage and iteratively increase a duty cycle of the PWM gate voltage until a measured current in the load path is determined to exceed a current limit value based on the output of the current sensor.

7. The system of claim 6 wherein the electrical load is a resistive element of an electric seat heater.

8. The system of claim 6 wherein the voltage source includes at least one microcontroller-controlled switching element.

9. The system of claim 6 wherein the voltage source includes a proportional-integral-derivative controller.

10. The system of claim 6 further including a capacitor coupled in parallel between a gate terminal and a source terminal of the power MOSFET.

11. The system of claim 6 wherein the frequency of the PWM gate voltage is between 20 kHz and 80 kHz and wherein the duty cycle of the PWM gate voltage is between 0.2 and 0.8.

12. The system of claim 6 wherein the electrical load is coupled to a drain terminal or a source terminal of the power MOSFET.

13. The system of claim 6 wherein the electrical load includes a capacitive element or an inductive element.

* * * * *